(12) United States Patent
McPherson et al.

(10) Patent No.: US 6,298,025 B1
(45) Date of Patent: Oct. 2, 2001

(54) RECORDING AND PLAYBACK OF MULTI-CHANNEL DIGITAL AUDIO HAVING DIFFERENT RESOLUTIONS FOR DIFFERENT CHANNELS

(75) Inventors: Alan McPherson, Burbank; Gregory Thagard, Encino; Edwin Outwater, III, Santa Monica; Christopher Cookson, Los Angeles, all of CA (US)

(73) Assignee: Warner Music Group Inc., New York, NY (US)

( * ) Notice: Subject to any disclaimer, the term of this patent is extended or adjusted under 35 U.S.C. 154(b) by 0 days.

(21) Appl. No.: 09/066,042

(22) Filed: Apr. 24, 1998

Related U.S. Application Data (60) Provisional application No. 60/045,598, filed on May 5, 1997, provisional application No. 60/045,599, filed on May 5, 1997, and provisional application No. 60/045,878, filed on May 5, 1997.

(51) Int. Cl.[7] ............................................. G11B 7/00
(52) U.S. Cl. ............................... 369/59.21; 369/59.25; 369/59.27
(58) Field of Search ................................ 369/48, 47, 59; 360/32, 8, 24

(56) References Cited

U.S. PATENT DOCUMENTS

| | | | |
|---|---|---|---|
| 5,136,650 | 8/1992 | Griesinger | 381/22 |
| 5,247,396 * | 9/1993 | Nagai et al. | 360/8 |
| 5,506,907 | 4/1996 | Ueno et al. | 381/18 |
| 5,539,716 | 7/1996 | Furuhashi | 369/59 |
| 5,570,308 | 10/1996 | Ochi | 364/724.1 |
| 5,638,451 | 6/1997 | Sedlmeyer | 381/2 |
| 5,844,513 | 12/1998 | Nishio | 341/143 |
| 5,974,380 * | 10/1999 | Smyth et al. | 704/229 |

FOREIGN PATENT DOCUMENTS

| | | |
|---|---|---|
| 0 293 480 A1 | 12/1988 | (EP) . |
| 0 381 807 A2 | 8/1990 | (EP) . |
| 0 462 381 A2 | 12/1991 | (EP) . |
| 0 600 677 A1 | 6/1994 | (EP) . |
| 0 734 019 A1 | 9/1996 | (EP) . |
| 6-215483 | 8/1994 | (JP) . |
| WO 95/21491 | 8/1995 | (WO) . |

* cited by examiner

Primary Examiner—Nabil Hindi
(74) Attorney, Agent, or Firm—Fish & Neave; Robert R. Jackson; Joo-Youn Park (57) ABSTRACT

Methods and apparatus for recording on DVD-like recording media in which audio content is stored in a high-capacity multi-channel (e.g., six-channel) format are provided. Various channels may use various resolutions. A two-channel audio output may be derived from the multi-channel audio data stream during playback. To facilitate an accurate derivation, the mixing coefficients to be used in generating the derivation can be supplied along with the six-channel audio data.

19 Claims, 6 Drawing Sheets

| CHANNEL 1 DATA | RESOLUTION 1 |
| --- | --- |
| CHANNEL 2 DATA | RESOLUTION 2 |
| CHANNEL 3 DATA | RESOLUTION 3 |
|  |  |
|  |  |
|  |  |
| CHANNEL N DATA | RESOLUTION K |

RECORDING AND PLAYBACK OF MULTI-CHANNEL DIGITAL AUDIO HAVING DIFFERENT RESOLUTIONS FOR DIFFERENT CHANNELS

This application claims the benefit of United States provisional patent applications Nos. 60/045,598, 60/045,599, and 60/045,878, all filed May 5, 1997.

BACKGROUND OF THE INVENTION

This invention relates to recording and playback of multi-channel digital audio having different resolutions for different channels and concerns digital recording media generally like digital versatile discs. More particularly, this invention concerns such recording media that primarily contain audio information.

Commonly assigned McPherson et al. U.S. patent application Ser. No. 09/066041, filed Apr. 24, 1998 and Thagard et al. U.S. patent application Ser. No. 09/066,043, filed Apr. 24, 1998 are incorporated herein by reference.

Digital versatile discs ("DVDs") are two-sided high-density digital information recording media approximately the size of standard compact discs ("CDs"). Digital versatile discs are capable of holding approximately 4.7 gigabytes of data per side. Their large storage capacity and small size make DVDs attractive for replacing videocassette tapes for use in home video systems.

DVDs support the Moving Picture Experts Group ("MPEG") MPEG-2 digital video standard. DVDs are also capable of handling Dolby's AC-3 multichannel audio format or, alternatively, an uncompressed pulse code modulation ("PCM") encoded dual-channel format.

However, because standard DVDs are directed primarily toward supporting the storage and display of video content, standard DVDs are not particularly well suited for supporting content that is primarily audio, especially enhanced audio, such as six-channel audio, including sampling at rates that are higher than those that have been conventionally used.

It is therefore an object of the present invention to provide methods and apparatus for recording that use DVD-type technology but that are better adapted for handling content that is primarily audio.

SUMMARY OF THE INVENTION

This and other objects of the present invention are accomplished in accordance with the principles of the invention by providing methods and apparatus for recording on DVD-like recording media in which audio content is stored in a high-capacity multi-channel (e.g., six-channel) format. An example of such a high-capacity multi-channel system is a six-channel system in which the six channels may be represented by uncompressed data (e.g., PCM data). Each channel may be encoded at a different rate. For example, the front and center channels may use 96 KHz encoding, the rear channels may use 48 KHz encoding, and the subwoofer channel may use 12 KHz encoding. Each channel may use a separate data depth. For example, the front and center channels may be encoded using 20-bit words and the rear channels may be encoded using 16-bit words.

If desired, a two-channel audio output may be derived from the six-channel audio data stream during playback. To facilitate an accurate derivation, the mixing coefficients to be used in generating the derivation can be supplied along with the six-channel audio data.

Alternatively, six-channel audio tracks may be accompanied by two-channel audio tracks having essentially the same content as the six-channel tracks. The recording media of the present invention allows this additional two-channel audio track to be stored in multiple formats, so that producers of audio content and disc manufacturers have multiple two-channel encoding options.

Further features of the invention, its nature and various advantages will be more apparent from the following more detailed description.

DESCRIPTION OF THE PREFERRED EMBODIMENTS

In the DVD-like recording media of the present invention, the content is primarily audio. Because a given audio segment consumes considerably less real estate on the disc than a video segment of the same length, restricting most of the content of the disc to audio allows a greater portion of the capacity of the disc to be allocated for audio reproduction. As a result, six channels of high-quality audio (encoded, e.g., in a linear PCM or $\Delta\Sigma$ modulation format) may be used. The six channels that are typically encoded are: left front, center front, right front, left rear, subwoofer, and right rear.

Audio channels can be encoded using different resolutions. Because the front channels are generally the most important channels, the front channels may be coded at the highest resolution. The rear channels, which are less important than the front channels, may be encoded at a lower resolution. The subwoofer channel generally has the lowest resolution requirements and may be encoded at a resolution lower than the rear channels. In addition to the six-channel audio channels just described, a software carrier may have other channels for the same audio programming in other formats. For example, the software carrier may also have two other channels for a two-channel (left and right) stereophonic version of the audio programming. The resolution used for these two channels will typically be the same, but it may be different from the resolution used for any of the six-channel audio channels (or it could be the same as the resolution used for one or more of the six-channel audio channels).

In the case of a software carrier with six-channel audio accompanied by two-channel audio, the six-channel audio data may be stored in a single stream on a first track, while the two-channel audio data is stored in a single stream on a second track. In another embodiment, the data for the two different formats is interleaved in a single track.

Figure 1:
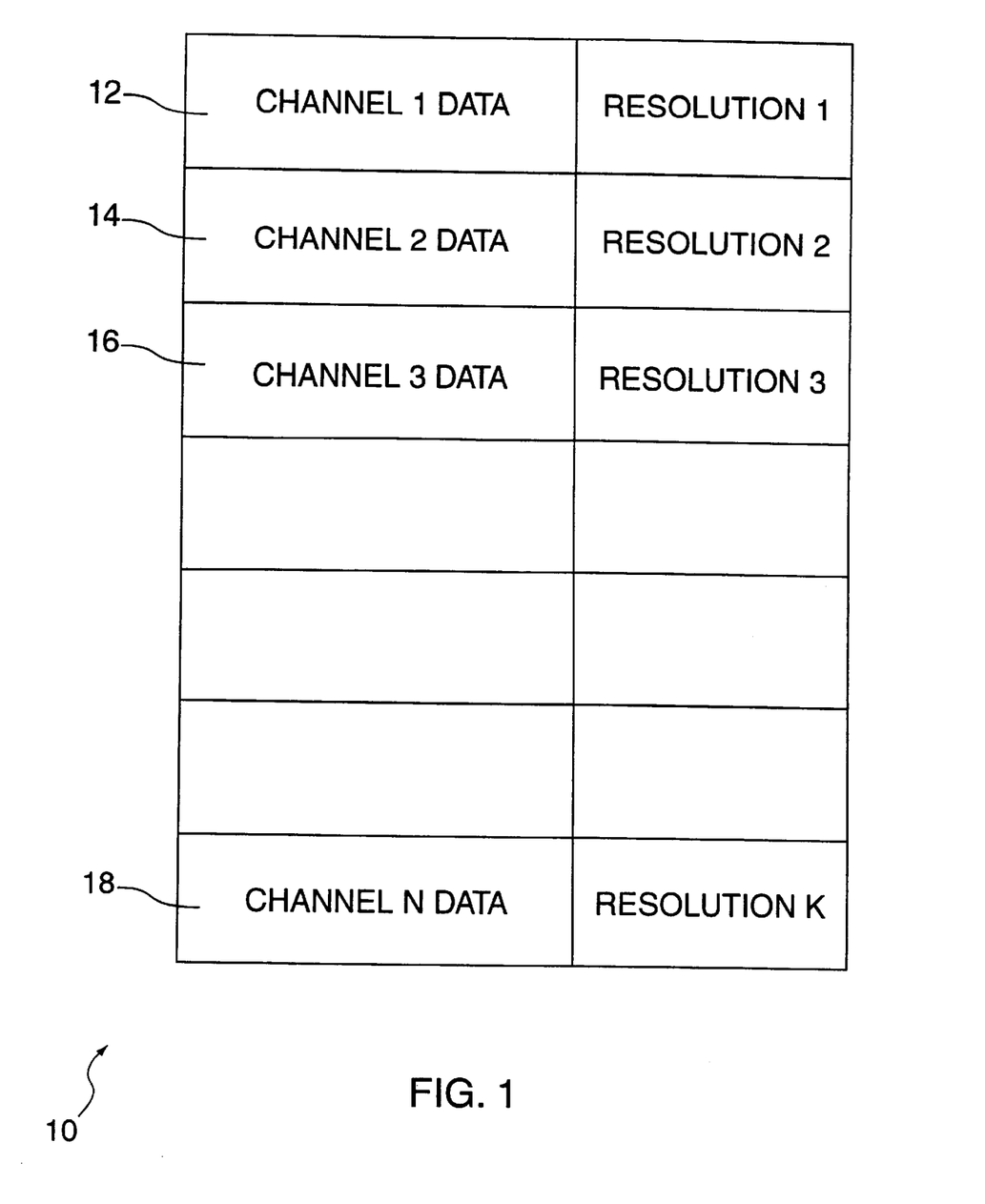
FIG. 1 is a chart of several data channels and corresponding resolutions.
Figure 2:
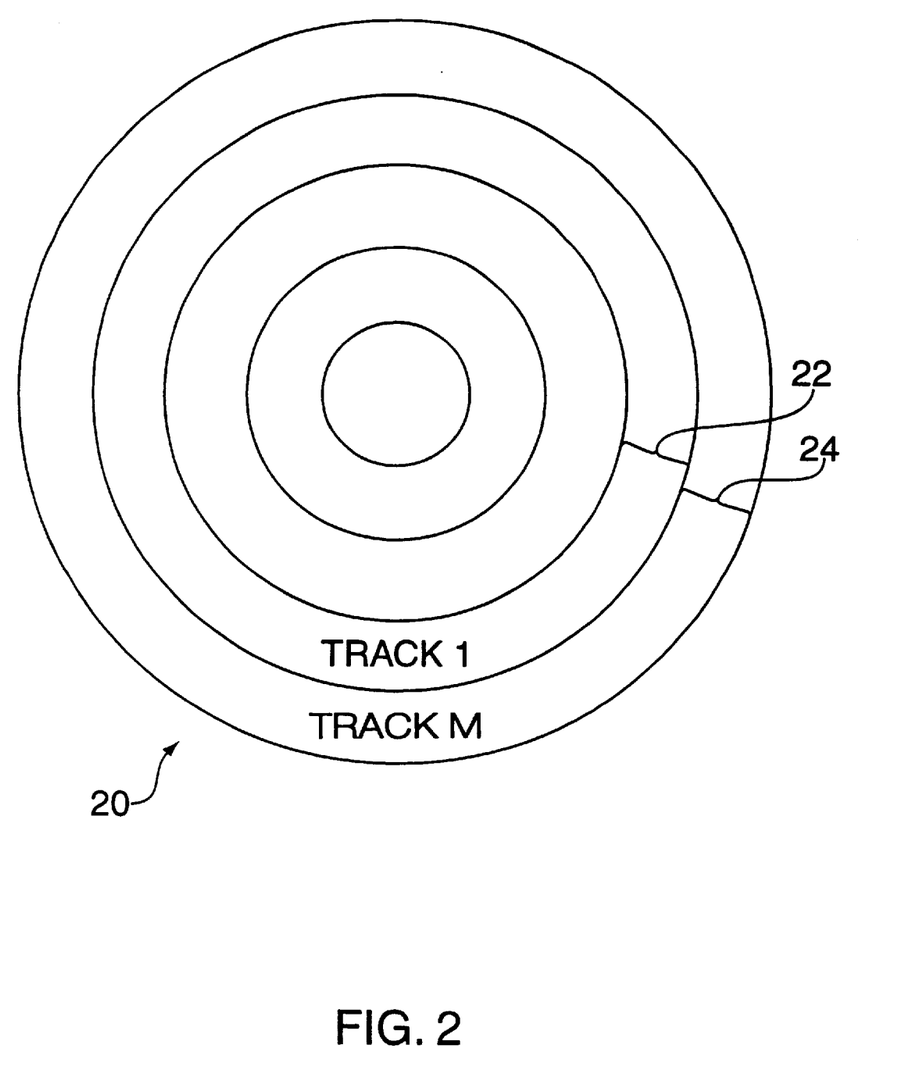
FIG. 2 is a simplified elevational view of a preferred software carrier.

As shown in FIG. 1, N channels of audio data (represented by numbers 12, 14, 16, and 18, for example) are provided on a software carrier 10 (such as DVD disc 20 in FIG. 2). N may include one or more channels. For example when N=8, there could be six channels for six-channel audio, as well as two channels for two-channel audio. Of course, there are many possible channel formats for providing audio programming on the software carrier. There can be any of K different resolutions used for the data in the various channels, where K is less than or equal to N. Each of the N channels can have its own resolution (in which case K equals N) or several channels can share the same resolution (in which case K is less than N).

As shown in FIG. 1, different resolutions correspond to different sampling rates and/or different sample word lengths (i.e., a greater resolution means a greater sampling frequency and/or a longer sample word length). There are two families of sampling rates commonly used at present in the recording industry. The first family includes rates of 48, 96, and 192 kHz. The second family includes rates of 44.1, 88.2, and 176.4 KHz. At present, the highest rates in each family (192 KHz and 176.4 KHz) are only supported in stereo, not in any other multichannel format. Both families can be used with bit depths of 16, 20 and 24 bits.

As shown in FIG. 2, channels 1-N may be provided in multiple tracks on a software carrier such as a DVD disc 20. For example, track 1 (which may include channels 1-I (e.g., six channels for six-channel audio) is labeled 22, and track M (which may include channels J-N (e.g., two channels for twochannel audio) is labeled 24. Several channels are typically provided in a single stream in each track, so that M is less than N. For example, when N=8, I=6, and M=2, track 1 includes channels 1–6 and track 2 includes channels 7 and 8.

Audio channels may be encoded using a number of different techniques. For example, the audio channels may be encoded at different rates. As an illustration of this in the case of six-channel audio, the front channels can be encoded at 96 KHz, the rear channels can be encoded at 48 KHz, and the subwoofer channel can be encoded at 12 KHz. Alternatively, the front channels can be encoded at 88.2 KHz, the rear channels can be encoded at 44.1 KHz, and the subwoofer channel can be encoded at 11.025 KHz. These combinations of encoding rates are only illustrative and any other suitable combination of encoding rates may be used instead if desired.

In suitable encoding rate configurations, the encoding rate used for the left front channel is preferably the same as that used for the right front channel. Similarly, the encoding rate used for the left rear channel is preferably the same as that used for the right rear channel. Matching the right and left sides in this way ensures that the audio playback of the disc is balanced.

Another consideration involves the relationship between the various encoding rates. As shown in the illustrative examples above, channels are preferably encoded at rates that are integral multiples of the encoding rates used for other channels. For example, the 96 KHz encoding rate used for encoding the front channels in the first illustrative example above is two times (2×) the encoding rate of 48 KHz that is used to encode the rear channels and is eight times (8×) the encoding rate of 12 KHz used to encode the subwoofer channel. Similarly, the 88.2 KHz encoding rate used for encoding the front channels in the second illustrative example above is two times (2×) the encoding rate of 44.1 KHz that is used to encode the rear channels and is eight times (8×) the encoding rate of 11.025 KHz used to encode the subwoofer channel.

In addition to varying the encoding rate, the resolution of the audio channels can be varied by using data words of different sizes for different channels (see again FIG. 1). For example, the front and center channels can be encoded using 20-bit words and the rear and subwoofer channels can be encoded using 16-bit words. Data words of any suitable word lengths may be used, including 16-bit words, 18-bit words, 20-bit words, and 24-bit words. If desired, both the encoding rates and the word lengths used to encode the different audio channels may be varied.

One advantage of the variable resolution audio channel encoding scheme of the present invention is that it allows less important audio information (such as the information on the rear and subwoofer channels) to be encoded with lower encoding rates and/or data word lengths than the more important audio information. Because data encoded with a lower resolution consumes less disc real estate than data encoded with a higher resolution, selectively encoding some channels with a lower resolution allows the overall resources consumed by the audio content on the disc to be conserved without sacrificing the quality of the most important audio content.

Because at least the subwoofer channel is typically recorded with a lower resolution than the other channels, six-channel audio is sometimes referred to as 5.1 audio.

Another aspect of the present invention involves supporting the capability of playback apparatus for the recording media to provide a two-channel (stereo) output. This capability is desirable because many consumers may not have audio equipment capable of handling six channels, but may have more common two-channel equipment.

One way in which to provide a two-channel output is to derive the output from the existing six channels of audio on the disc. Deriving the two-channel output involves applying appropriate mixing weights to each of the six channels. For example, the left stereo channel may be derived by using a 50% weight for the left front channel, a 50% weight for the center front channel, a 50% weight for the left rear channel front, and a 50% weight for the subwoofer. The right stereo channel may be derived by summing the right front, center front, right rear, and subwoofer channels using the same weighting scheme.

Because static weighting coefficients may sometimes lead to undesirable sonic effects, the present invention involves the use of dynamic weighting coefficients. These weighting coefficients, which are encoded onto the recording media in parallel with the audio data, allow the mixing operation to be as accurate as possible. In addition, because the artist or producer may be provided with the ability to give approval of the resulting audio mix, providing embedded weighting coefficients allows the artist or producer to certify a given derived audio mix. This permits the cost saving benefits of the derivation technique to be realized without forcing the artist or producer to relinquish control of the final mix. Unlike conventional DVD audio, the present invention handles the mixing of audio channels of different resolutions and may mix the channels together while the audio data is in its expanded (uncompressed) state.

Another way in which to provide the capability of providing a two-channel audio output is to encode a fixed two-channel (stereo) data stream onto the recording media, rather than deriving the output in real time. Status bit data may be used to indicate whether the two-channel output of the recording media is based on derived data or is based on fixed data. The recording media of the present invention allows several different audio encoding formats to be used to provide the fixed two-channel audio, so that producers of audio content and disc manufacturers have multiple twochannel encoding options. Suitable audio encoding formats include delta-sigma modulation encoding schemes, linear PCM, losslessly compressed delta-sigma modulation encoding, and losslessly compressed PCM. Suitable lossless compression schemes for use in the present invention are the Huffman and run length encoding schemes.

If desired, the recording media of this invention may use standard DVD encryption techniques (e.g. 40 bit encryption) to prevent unauthorized users from copying the contents of the recording media.

Audio data on the recording media is preferably stored in 2K-byte sectors organized in 32K-byte blocks. Sectors may contain audio data, video data, sub-picture or subtitle data, and program branch information (allowing a user to jump to various points within the disc during use of the disc). Each 2K-bytes of audio information is preferably preceded by an approximately 48 byte header. (The size of this header is illustrative and any other suitable size may be used.) Preferably the recording media of the present invention use the Universal Disc Format ("UDF") specification promulgated by the Optical Storage Trade Association ("OSTA"). A file directory structure resides on the disc. Video information (if any is provided) is stored in sectors having 156 byte headers. In addition, video may precede audio (i.e., the video information on the disc is placed on the innermost tracks of the disc, which are read first during playback). Conversely, audio may precede video (i.e., the audio information on the disc is placed on the innermost tracks of the disc, which are read first during playback). These formatting standards allow computers to handle data stored on the recording media.

With the emergence of multi-channel digital audio, the control offered to the listener has increased dramatically. For example, in most multi-channel digital audio systems, listener are able to control various parameters such as front/rear/right/left balance, reverberation, as well as many audio special effects related to such effects as three-dimensional sound—not only the bass/treble and balance parameters usually offered in most stereo systems. Listeners are able to control these parameters at initialization (i.e., the start of reproduction of the audio piece) as well as during reproduction. For many users, this increased control over the parameters of the reproduction environment presents a bewildering array of options. In order to allow the listener to dispense with the often time consuming process of initializing the parameters of the reproduction environment, the multi-channel audio data can be supplemented with system initialization data. This also allows the listener to listen to the audio in the manner originally intended by the artist/producer. Of course, these stored initial parameters are merely default values and can be overridden by the listener at any time.

A portion of each sector may be reserved for "smart content" data. Such data is used to provide information for setting parameters of the user's audio equipment based on default information or based on tests performed by the audio system when the disc is played. A typical test may involve generating a test pulse and measuring the response of the listening environment and audio system to the pulse. Delay times and other parameters may then be adjusted based on the results of the test.

In addition, the recording media of the present invention may contain data for configuring the user's equipment differently for different musical selections (or portions of such selections). Musical selections that require high resolution are encoded at high encoding rates. Musical selections that require lower resolution are encoded at lower encoding rates. Configuration information embedded in the disc allows the user's playback equipment to respond to these changes in resolution during playback. Such configuration information is preferably provided in each data sector. Other configuration information that may be provided on the disc at the sector level includes the mixing coefficients used for deriving two-channel audio output from a six-channel audio track on the disc.

Data may be stored on the recording media to support private data and conditional access features. For example, data may be provided on the recording media that allows locked areas of the recording media that contain songs or other information to be unlocked by the user. The user typically pays a fee and receives a digital key for unlocking the desired information. The digital key may be transmitted to the user's playback equipment over the Internet, the phone network, cable television networks (e.g., using a cable modem or during the vertical blanking interval), satellite distribution systems, or a combination of such delivery arrangements.

Information to be displayed by a liquid crystal display or other suitable type of display on the user's equipment can be provided on the disc. Such information may be displayed during disc playback. For example, bit maps for displaying the lyrics of a musical selection may be provided. Alternatively, ASCII or similarly coded text data may be used. Bit maps are more versatile for displaying languages that use non-ASCII character sets, but ASCII-type codes use less memory and allow less expensive playback devices to be used.

In addition to lyrics, information such as an album title, current song selection, and artist, can be displayed during playback. If the recording media that are being played are broadcast directly to a user's equipment using digital transmission techniques such as digital radio, the display information encoded on the disc is provided to the user. A user listening to the radio may then be automatically informed of the selection currently being played, even if the disc jockey at the radio station playing the selection does not announce the title of the song. Promotional information can be displayed using similar techniques. The bit map and ASCII data used to display information during playback may be provided in the headers of the 2K-byte data sectors. When a large amount of data is involved, information in a given header may point to a suitable data location in the remainder of the sector where the bit map or text information is stored.

Figure 3:
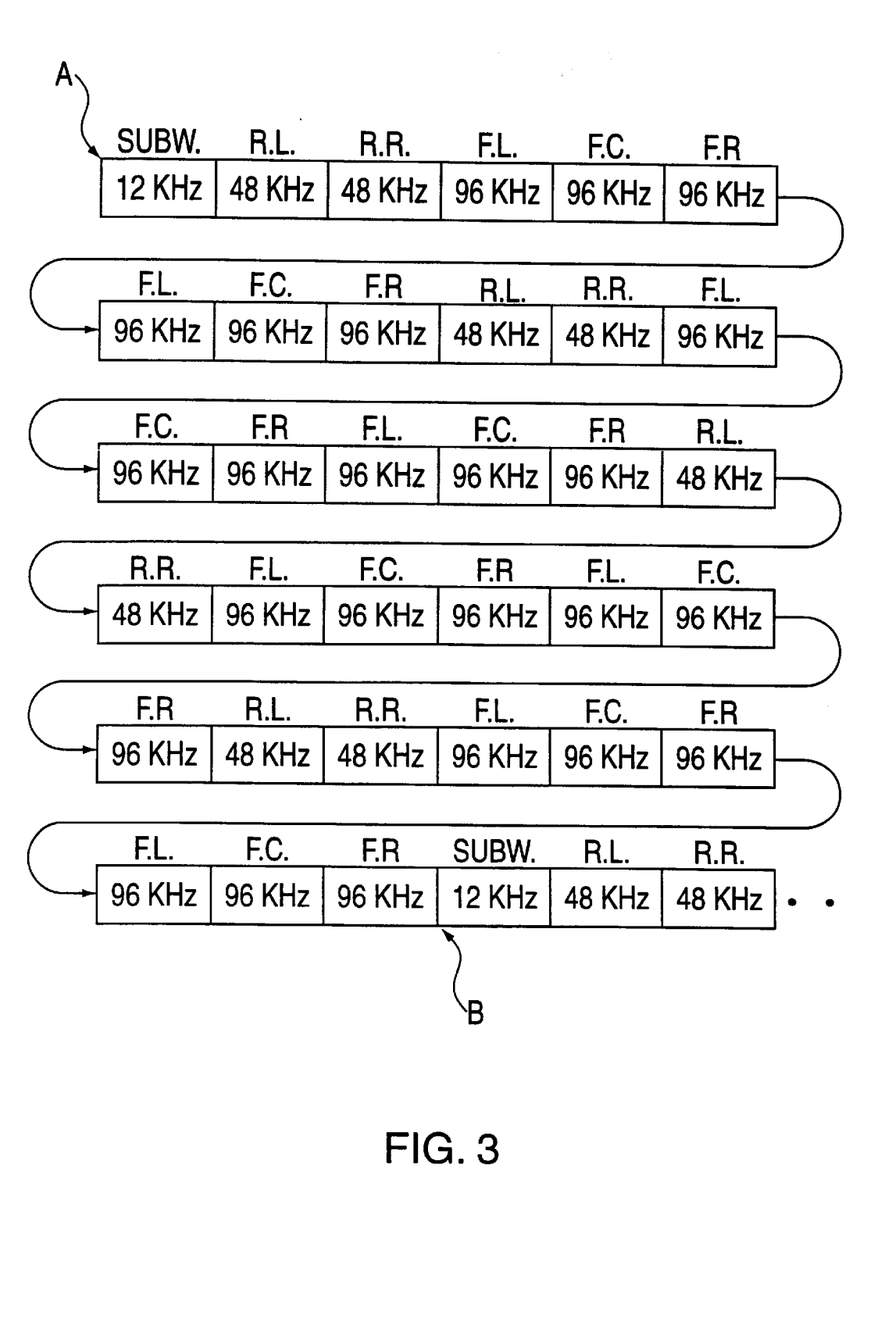
FIG. 3 is a chart showing a preferred order of recording samples on DVD-type six-channel recording media.

FIG. 3 shows a preferred order of recording samples on DVD-type six-channel recording media. The samples between points A and B (points A and B define a frame, i.e., a distance or time interval between two sequential samples of the lowest frequency) are all taken from one time interval in the original information and include one 12 KHz subwoofer channel sample, four 48 KHz rear left samples, four 48 KHz rear right samples, eight 96 KHz front left samples, eight 96 KHz front center samples, and eight 96 KHz front right samples. The preferred recording order for these samples shown in FIG. 3 is such that the samples are read out one after another from left to right and from top to bottom as viewed in FIG. 3. Thus the recording order is preferably such that the first sample read out (at point A) is a lowest frequency sample. The next samples read out are intermediate frequency samples. The next samples read out are highest frequency samples. Then more intermediate frequency samples are read out, followed by more highest frequency samples. This pattern continues until it is time (at point B) to read out another of the lowest frequency samples, and then the whole pattern repeats again.

The above-described recording order (and consequent reading out order) provides samples from the recording media in most nearly the order in which they are needed by the playback circuitry (including the circuitry needed to derive two-channel stereo from six-channel recorded information). This will be more apparent from the following description of illustrative playback circuitry.

Figure 4:
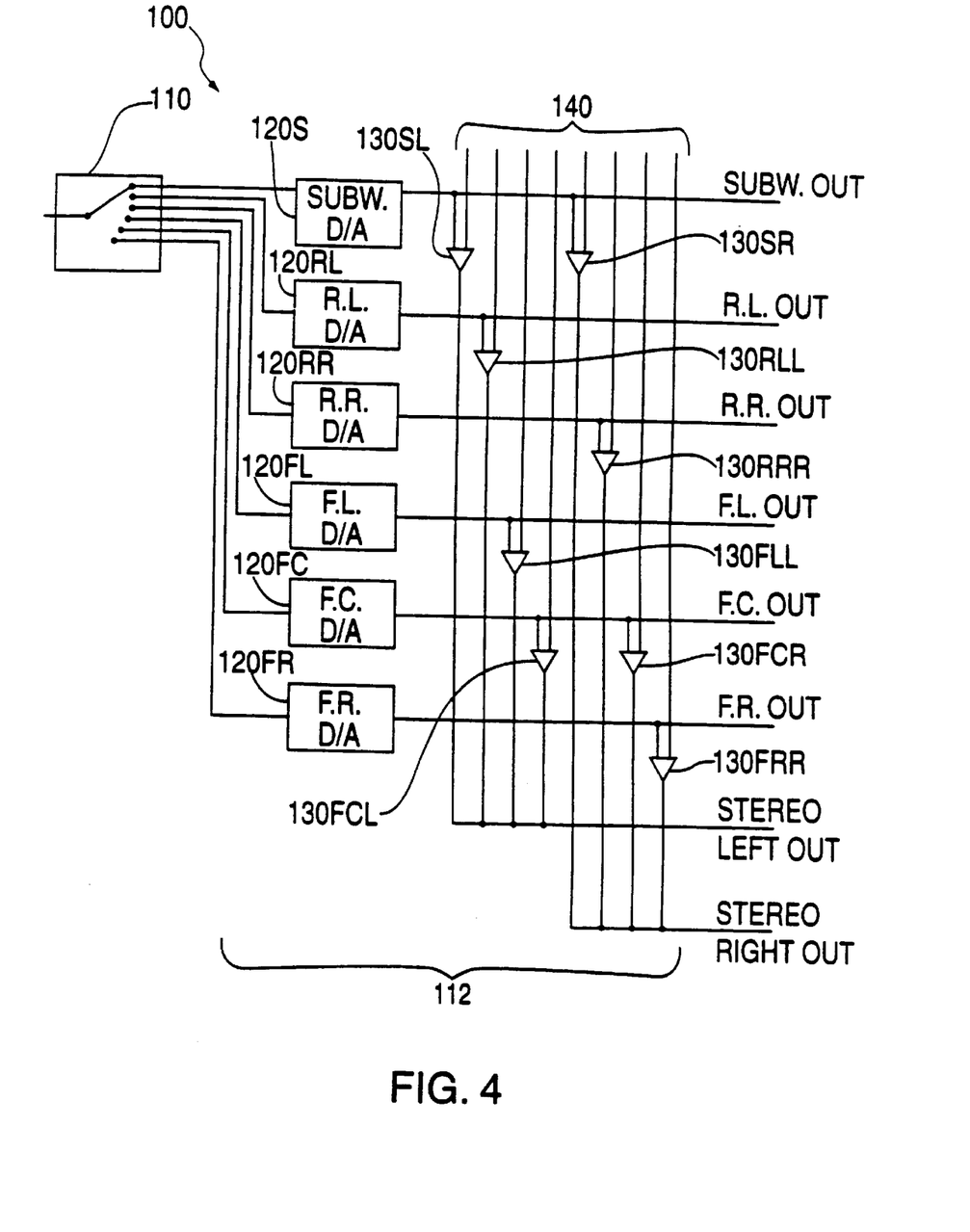
FIG. 4 is a simplified schematic block diagram of an illustrative playback circuit.

In the illustrative playback circuit 100 shown in FIG. 4 the samples read from the DVD-type disc are supplied one after another to the left-hand terminal of demultiplexer 110. Demultiplexer 110 switches each successive sample into the correct one of the six output channels of conversion unit 112. For example, each subwoofer channel sample is switched into the subwoofer channel which includes subwoofer channel digital-to-analog ("D/A") converter 120S. This D/A converter converts the samples it receives to an analog subwoofer channel output signal ("SUBW. OUT"). Similarly, demultiplexer 110 applies each rear left channel sample to rear left channel D/A converter 120RL which produces an analog rear left channel output signal ("R.L. OUT"). Each rear right channel sample is similarly applied to rear right channel D/A converter 120RR. And each of the front left, front center, front right channel samples are similarly applied to D/A converters 120FL, 120FC, and 120FR, respectively. Thus the top six outputs shown in the right in FIG. 4 are six analog signals for use in a six-channel audio system.

FIG. 4 also shows how the left and right two-channel stereo outputs may be derived from the six-channel signals. The left stereo output signal ("STEREO LEFT OUT") is produced by appropriately weighting each of the SUBW. OUT signal, the R.L. OUT signal, the F.L. OUT signal, and the F.C. OUT signal and combining the resulting signals. Operational amplifiers 130SL, 13ORLL, 130FLL, and 13OFCL are respectively used to weight these signals for combination to produce the STEREO LEFT OUT signal. Similarly, the right stereo output signal is produced by appropriately weighting each of the SUBW. OUT signal, the R.R. OUT signal, the F.C. OUT signal, and the F.R. OUT signal (using operational amplifiers 130SR, 130RRR, 130FCR, and 130FRR, respectively) and combining the resulting signals. The weighting factors used by operational amplifiers 130 are supplied via leads 140.

Figure 5:
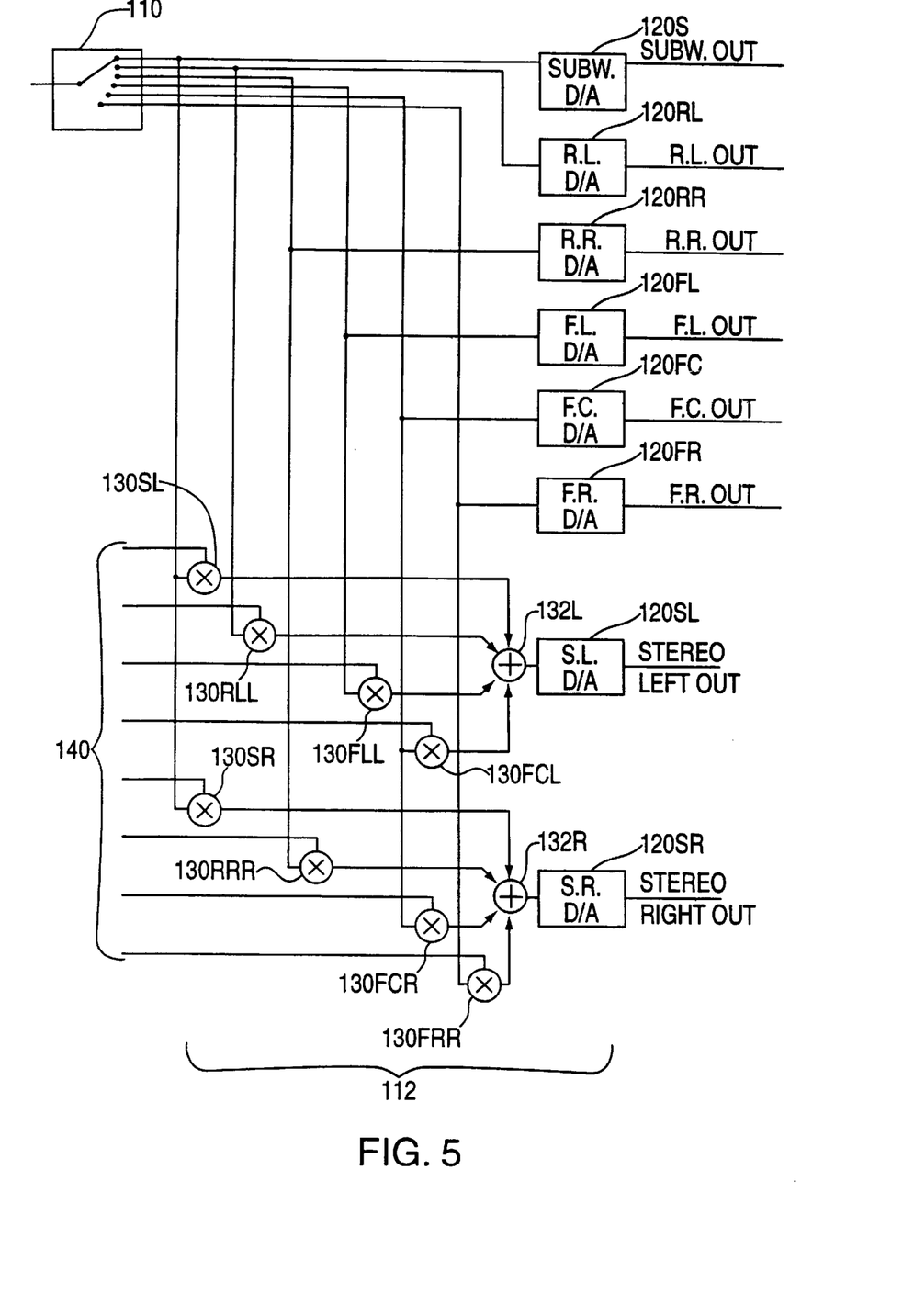
FIG. 5 is a simplified schematic block diagram of another illustrative playback circuit.

FIG. 5 shows an alternative embodiment of conversion unit 112 of FIG. 4 in which the two-channel stereo signals are derived from the six-channel audio signals in the digital domain (rather than in the analog domain as is done in FIG. 4). In FIG. 5 elements 130 are digital multipliers for multiplying successive samples from demultiplexer 110 by various appropriate digital weighting factors supplied via leads 140. Elements 132L and 132R are digital adders for combining the multiplier 130 outputs that contribute to the left and right stereo channels, respectively. D/A converters 120SL and 120SR respectively convert the digital outputs of adders 132L and 132R to the analog left and right stereo output signals. In all other respects FIG. 5 is similar to FIG. 4. Note that in order for each adder 132 to receive something from each associated multiplier 130 during each operating cycle of the adder, some of the multipliers 130 may recycle and reuse the inputs they receive from demultiplexer 110 until the next new sample comes from demultiplexer 110 for that multiplier.

It will be apparent from studying FIGS. 3 and 4 together or FIGS. 3 and 5 together that the recording and consequent playback order for samples shown in FIG. 3 produces samples from the recording media in the order which comes closest to the order in which those samples are needed by the D/A converters 120 in the various channels in FIG. 4, or by the corresponding D/A converters 120 and digital components 130 and 132 in FIG. 5. This order of the samples therefore minimizes the amount of buffering needed in the various D/A converters and digital components to resynchronize the data across the various channels and to even out the rate of the samples in each channel.

The following is an illustrative, summary-form, specification in accordance with this invention (as described more fully above) for DVD-like disc recording media for audio information:

Preferred Disc Parameters 5.1 (6 channel).

Derivative 2-channel mix capability.

Compressed or uncompressed.

Sampling rate 44.1 KHz or 48 KHz, 88.2 KHz or 96 Khz, 176.4 Khz or 192 KHz subwoofer 11.025 KHz or 12 KHz.

Each sound field (e.g., front and back) in even multiples of one another in terms of sampling rates (i.e., 12, 48, and 96 KHz, or 11.025, 44.1, and 88.2 KHz).

Lossless coding (i.e., Huffman or run length or both).

Encryption (40 bits).

Smart content reserved data specified in disc format.

Musical selection configuration—headers resent with each block to support smart content, sample rate identification, word length identification, word length scale factor, derived 2-channel mix coefficients, etc.

Private data/conditional access.

Display data—reserved data for CD text-like display; bit map display as in DVD video; ASCII for use on juke box type players (album title, song title, artist) for use on LCD type display.

Optional Disc Parameters

Note: All optional items must be reserved on disc format specification smart content reserved data.

Separate 2-channel mix (LPCM) with specified sample rates and bit depths; if 2-channel mix is included, derived 2-channel data is not required, and 2-channel mix status bits are included.

Other alternative coding schemes (e.g., deltasigma). (If used, derivative 2-channel information must be included.)

MPEG video. (Will reside above UDF layer using existing standards including LPCM and/or AC-3.)

Text and graphics. Using Karaoke-defined subpicture and MPEG I frame specifications. (Consistent with DVD video specifications.)

Figure 6:
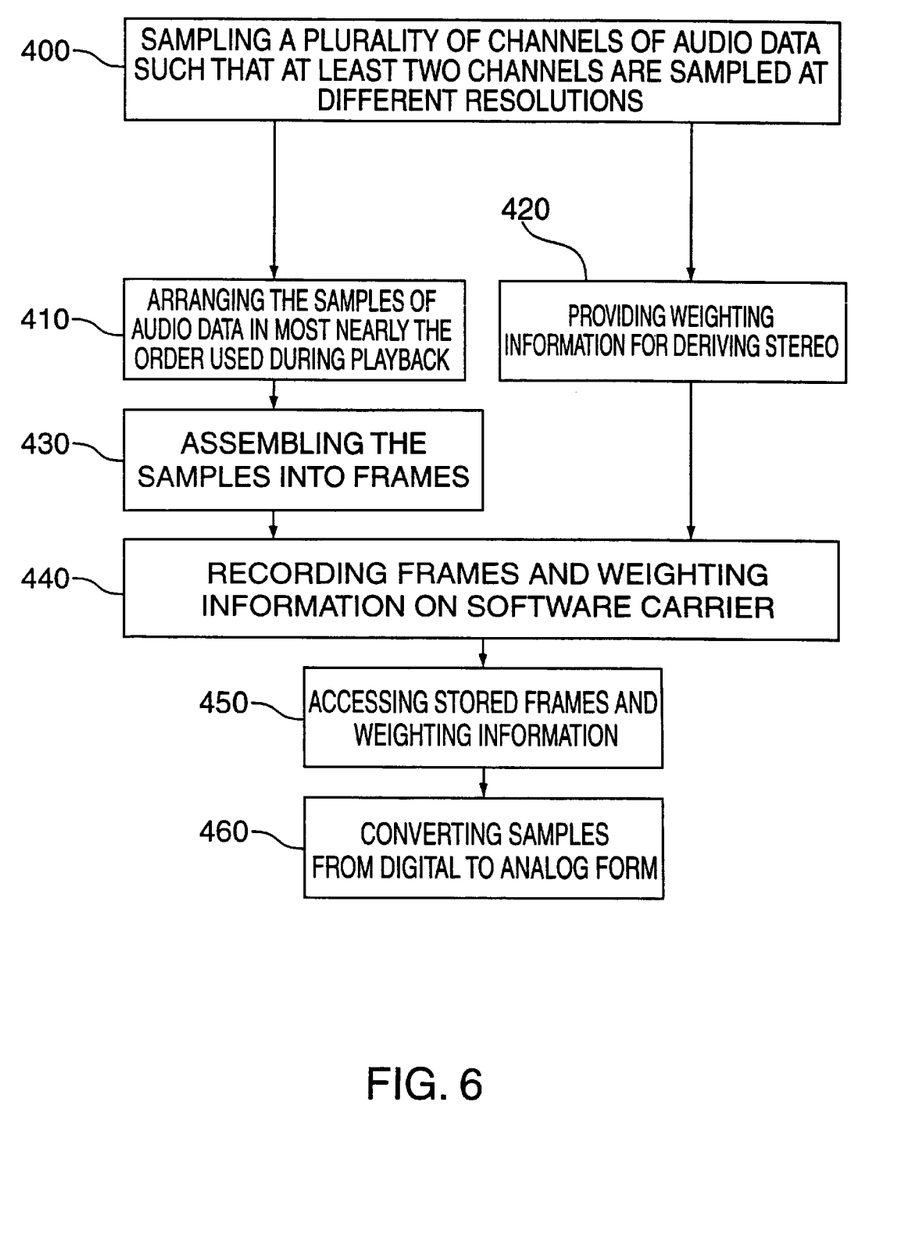
FIG. 6 is a flowchart of a preferred method of recording and playback.

A flowchart illustrating a method for recording and playing back multi-channel digital audio signal samples taken at different resolutions is provided in FIG. 6. A plurality of channels of audio data are sampled in step 400 such that at least two channels of the plurality of channels are sampled at different resolutions. The samples of the plurality of channels of audio data may be arranged in step 410 in most nearly the order needed during playback. The samples of the plurality of channels of audio data are assembled in step 430 into frames. Weighting information for deriving stereo is optionally provided in step 420. This weighting information can be provided in the same track as the plurality of channels of audio data or in a separate track. The frames and weighting information are recorded in step 440 on the software carrier. The frames and weighting information stored on the software carrier are accessed from the software carrier in step 450. The samples of audio data are converted in step 460 from digital to analog form in order that the audio programming can be played.

The multi-channel digital audio system of the present invention may also include a "smart system initialization" feature. This feature enables the listener to dispense with the often time consuming process of initializing the parameters of the reproduction environment allows the listener to listen to the audio in the manner originally intended by the artist/producer. The multi-channel audio data stored on the software carrier is supplemented with system initialization data usually provided in a track separate from the audio data track(s), however the system initialization data can also be interspersed with audio data on a single track in the same manner as any channel of audio data.

It will be understood that the foregoing is only illustrative of the principles of this invention, and that various modifications can be made by those skilled in the art without departing from the scope and spirit of the invention.

What is claimed is:

1. A method for providing multi-channel digital audio signal samples on a software carrier comprising:

sampling a plurality of channels of audio data using a plurality of sampling rates, said plurality of sampling rates including a highest sampling rate and a lowest sampling rate, and wherein each channel has an associated sampling rate and an associated number of samples, and wherein for each channel an associated ratio between the associated sampling rate and the associated number of samples is a constant;

selectively encoding at least two of said plurality of channels of audio data at different resolutions;

arranging the samples of said plurality of channels of audio data in most nearly an order needed during playback in a single stream in a track on said software carrier; and assembling said samples into frames wherein each frame defines an interval between two sequential samples that have been sampled at the lowest sampling rate.

2. The method of claim 1 further comprising:

providing weighting information for deriving two-channel stereo from said plurality of channels of audio data.

3. The method of claim 1 further comprising:

providing an additional two-channel audio track on said software carrier.

4. The method of claim 1, 2, or 3 wherein:

said selectively encoding includes encoding at least two of said plurality of channels of audio data at different data depths.

5. The method of claim 1, 2, or 3 wherein:

said selectively encoding includes encoding at least two of said plurality of channels of audio data at different encoding rates.

6. The method of claim 1, 2, or 3 wherein:

said selectively encoding includes encoding at least two of said plurality of channels of audio data at different data depths and different encoding rates.

7. A method for recording and playing back comprising:

recording samples of a plurality of channels of audio data on a software carrier using the method defined in claim 1;

accessing the samples of said plurality of channels of audio data from said software carrier; and converting the samples from digital to analog form.

8. The method of claim 7 further comprising:

providing weighting information for deriving two-channel stereo from said plurality of channels of audio data.

9. The method of claim 7, 1 or 8 wherein said converting further comprises:

deriving two-channel stereo from said plurality of channels of audio data by weighting the samples of said plurality of channels of audio data.

10. The method of claim 7, 1 or 8 wherein said converting further comprises:

deriving two-channel stereo from said plurality of channels of audio data by weighting the samples of said plurality of channels of audio data before said converting.

11. The method of claim 7, 1 or 8 further comprising:

providing an additional two-channel audio track on said software carrier.

12. The method of claim 7, or 8 wherein:

said recording includes encoding at least two of said plurality of channels of audio data at different data depths.

13. The method of claim 7 or 8 wherein:

said recording includes encoding at least two of said plurality of channels of audio data at different encoding rates.

14. The method of claim 7 or 8 wherein:

said recording includes encoding at least two of said plurality of channels of audio data at different data depths and different encoding rates.

15. A device for slaying back recorded multi-channel digital audio signal samples comprising:

a demultiplexer for accessing a plurality of channels of audio data provided in a single stream on a software carrier, wherein at least two channels of said plurality of channels are selectively encoded at different resolutions; and a conversion unit, wherein said conversion unit includes:
a plurality of digital-to-analog converters each arranged to receive one of said plurality of channels and convert the samples from digital to analog form;
a plurality of digital multipliers coupled to selected output leads of said demultiplexer for multiplying successive samples by various appropriate digital weighting factors; and
a plurality of digital adders for selectively combining the outputs of said plurality of digital multipliers, the outputs of the plurality of digital adders being coupled to selected inputs of said plurality of digital-to-analog converters for deriving two-channel stereo from said plurality of channels of audio data.

16. A method for recording multi-channel digital audio signal samples on a software carrier having a plurality of tracks, comprising:

sampling a plurality of channels of audio data using a plurality of sampling rates, said plurality of sampling rates including a highest sampling rate and a lowest sampling rate, and wherein each channel has an associated sampling rate and an associated number of samples, and wherein for each channel an associated ratio between the associated sampling rate and the associated number of samples is a constant;

selectively encoding at least two of said plurality of channels of audio data at different resolutions in a single stream in a first track on said software carrier;

assembling said samples into frames wherein each frame defines an interval between two sequential samples that have been sampled at the lowest sampling rate; and storing two-channel audio data in a second track on said software carrier.

17. The method of claim 16 wherein:

said selectively encoding includes encoding at least two of said plurality of channels of audio data at different data depths.

18. The method of claim 16 wherein:

said selectively encoding includes encoding at least two of said plurality of channels of audio data at different encoding rates.

19. The method of claim 16 wherein:

said selectively encoding includes encoding at least two of said plurality of channels of audio data at different data depths and different encoding rates.

* * * * *